United States Patent [19]
Arney et al.

[11] Patent Number: 5,636,052
[45] Date of Patent: *Jun. 3, 1997

[54] DIRECT VIEW DISPLAY BASED ON A MICROMECHANICAL MODULATION

[75] Inventors: Susanne C. Arney, Highland Park; Keith W. Goossen, Aberdeen; James A. Walker, Howell, all of N.J.

[73] Assignee: Lucent Technologies Inc., Murray Hill, N.J.

[*] Notice: The term of this patent shall not extend beyond the expiration date of Pat. No. 5,500,7561.

[21] Appl. No.: 283,106

[22] Filed: Jul. 29, 1994

[51] Int. Cl.$^6$ .................................................. G02B 26/00
[52] U.S. Cl. .................................. 359/291; 359/248
[58] Field of Search .......................... 359/291, 290, 359/248

[56] References Cited

U.S. PATENT DOCUMENTS

| | | | |
|---|---|---|---|
| 4,087,810 | 5/1978 | Hung et al. | 340/324 M |
| 4,954,789 | 9/1990 | Sampsell | 330/4.3 |
| 4,982,184 | 1/1991 | Kirkwood | 340/783 |
| 5,497,172 | 3/1996 | Doherty et al. | 345/85 |

FOREIGN PATENT DOCUMENTS

| | | |
|---|---|---|
| 0035299 | 9/1981 | European Pat. Off. . |
| WO86/04182 | 7/1986 | WIPO . |

OTHER PUBLICATIONS

Younse, "Mirrors on a Chip", IEEE Spectrum, (Nov. 1993), pp. 27–31.

Younse et al., "The Digital Micromirror Device (DMD) and its Transition to HDTV," EuroDisplay 1993, Le Club Visu and SID, Strasbourg, France (Sep. 1993).

Horbeck, "Deformable–Mirror Spatial Light Modulators," Proceedings of SPIE, v. 1150 (Aug. 1989) pp. 86–102.

Arantani, et al., "Process and Design Considerations for Surface Micromachined Beams for a Tunable Interferometer Array in Silicon," Proceedings of the IEEE Micro. Electro-Mech. Workshop, Ft. Lauderdale, Fla., Feb. 7–10, 1993, pp. 230–235.

Solgaard, et al., "Deformable Grating Optical Modulator," Optical Letters, vol. 17, No. 9, May 1992, pp. 688–690.

Wiszniewski, et al., "Mechanical Light Modulator Fabricated on a Silicon Chip Using SIMOX Technology," International Conference on Solid State Sensors & Actuators, Yokohama, Japan, Jun. 7–10, 1993, pp. 1027–1030.

Aratani et al., "Process and Design Consideration for Surface Micromachined Beams for a Tunable Interferometer Array in Silicon", Proc. IEEE Micro. ElectroMech. Wrkshp., Ft. Lauderdale, Fla., Feb. 7–10, 1993, pp. 230–235.

*Primary Examiner*—Georgia Y. Epps
*Assistant Examiner*—Dawn-Marie Bey

[57] ABSTRACT

A direct-view display comprising an array of micromechanical modulators is disclosed, he modulator used to form the display comprises a suspended, vertically moving membrane and a substrate. The device functions based on optical interference effects between the membrane and the substrate which cause the modulator to either substantially reflect or absorb an optical signal. The interference effects are a function of the size of the air gap between the membrane and substrate, which varies as the membrane moves. The membrane moves in response to a data signal, representative of an image, delivered to the modulator. The display generates an image based on the pattern of light and dark sections of the display corresponding to the reflectivity of each modulator at a given point in time.

9 Claims, 7 Drawing Sheets

DIRECT VIEW DISPLAY BASED ON A MICROMECHANICAL MODULATION

FIELD OF THE INVENTION

This invention relates generally to direct view displays, and more particularly to direct view displays that use micromechanical modulators as pixel elements.

BACKGROUND OF THE INVENTION

Recent advances in optomechanical technology, such as the development of micromodulators, have been applied to projection display systems.

A projection display comprised of micromodulators has been described by Younse in IEEE Spectrum at 27–31 (November 1993). In Younse's display, micromirrors are suspended over address electrodes and memory cells of a CMOS static ram. Each micromirror is associated with a particular memory cell. The micromirrors are suspended at diagonally opposed corners, which allows them to tilt under the action of bias. Bias is provided by a data signal which is stored on the address electrode. Electrostatic forces between the address electrodes and the mirror tilt the associated mirror either +10 degrees or −10 degrees. Light reflected from a mirror having a +10 degree tilt is imaged by a projection lens onto a screen. Light reflected from a mirror having a −10 degree tilt will not be imaged by the projection lens. Shading from white to black is determined based on the time during each video frame that the mirror is imaging through the projection lens. An image is created on the screen by the action of many such micromirrors.

The modulator described by Younse is only suitable for projection displays, since it works by deflecting light through specific angles. It may not be used for direct-view displays. For certain applications, such as very small displays, a projection-based display is unsuitable.

SUMMARY OF THE INVENTION

A direct view display comprising micromechanical modulators as the pixel elements is disclosed. The micromechanical modulator used for the display is, preferably, a modification of the modulator described in our commonly assigned U.S. Pat. No. 5,500,761 filed Jan. 27, 1994. The modulator comprises a substrate or plateau layer, and a membrane having at least one layer, spaced to form an air gap. The modulator further comprises electrodes so that bias may be applied to the modulator generating an electrostatic force that changes the position of the membrane relative to the substrate or plateau layer.

A plurality of such modulators are organized to form a display. Each of the modulators comprising the display is individually addressable through suitable drive electronics. In one embodiment, an address transistor is associated with each modulator. A data signal, representing an image, is carried along line address circuitry and delivered to the transistor of a modulator. The transistor acts as a switch to sample and store the signal as a voltage on the modulator address electrode. Depending upon the address electrode potential, the membrane either maintains, or moves from, its rest position. The refractive indices of the membrane and substrate are chosen so that the change in position of the membrane results in a change in the reflectivity of the modulator. Light reflected onto the modulators is either substantially reflected or absorbed as a function of the membrane position. An image is created based on the pattern of light and dark sections of the display corresponding to the reflectivity of each modulator at a given point in time. A grey scale is developed based upon the amount of time, per video frame, a modulator is reflecting or absorbing.

BRIEF DESCRIPTION OF THE DRAWINGS

Further features of the invention will become more apparent from the following detailed description of specific embodiments thereof when read in conjunction with the accompanying drawings, in which like elements have like reference numerals and in which.

DETAILED DESCRIPTION OF THE INVENTION

Figure 1:
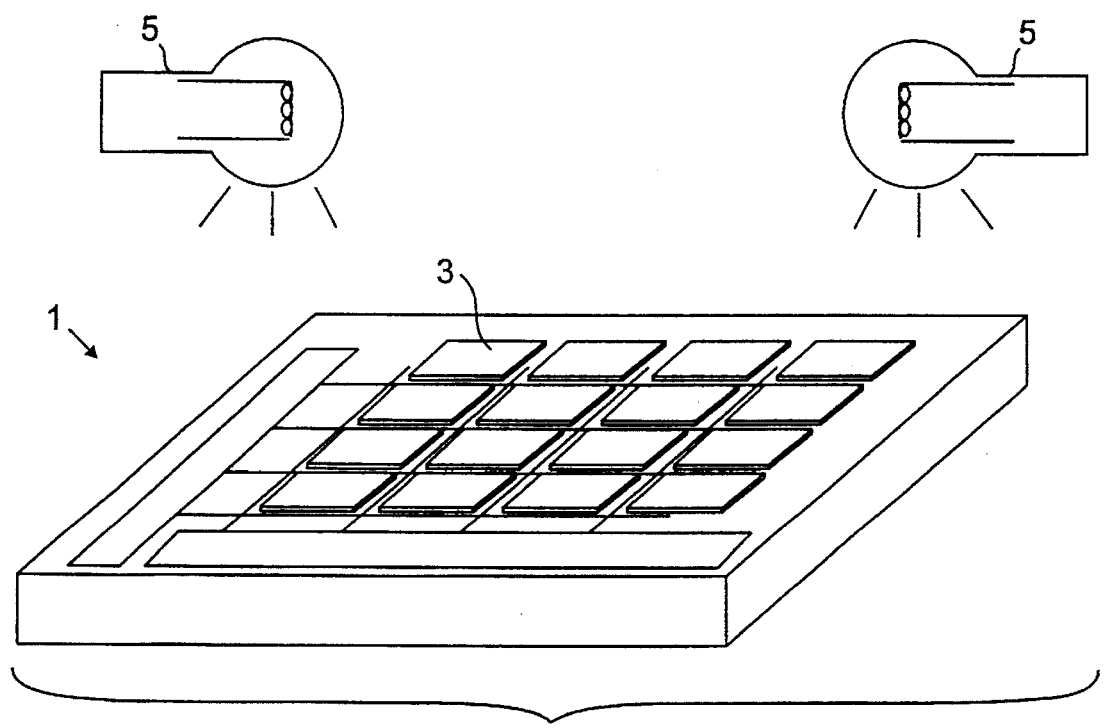
FIG. 1 is an embodiment of a display according to the present invention.

An embodiment of the direct-view display of the present invention, shown in FIG. 1, comprises a plurality of micromechanical modulators 3. Each modulator 3 may be considered to be a pixel of the display 1. A row—column pixel addressing scheme, referred to herein as the display drive electronics 2, allows each pixel of the display to be individually addressed.

Each pixel or modulator 3 has its own circuit elements, referred to herein as the modulator drive electronics 4. Since the modulator 3 is preferably fabricated entirely in silicon, the modulator drive electronics 4 may be co-fabricated with the modulator 3 so that the modulator and modulator drive electronics may be monolithically integrated. The display also includes a light source 5.

The pixel addressing arrangement described by L. J. Hornbeck in "Deformable-Mirror Spatial Light Modulators", Proc. SPIE, Vol. 1150 (Aug. 6, 1989) at 86–102 and J. M. Younse in IEEE Spectrum at 27–31 (November 1993) is suitable for use in forming a display 1 according to the invention. These articles, as well as all other articles mentioned herein, are incorporated by reference.

Figure 2A:
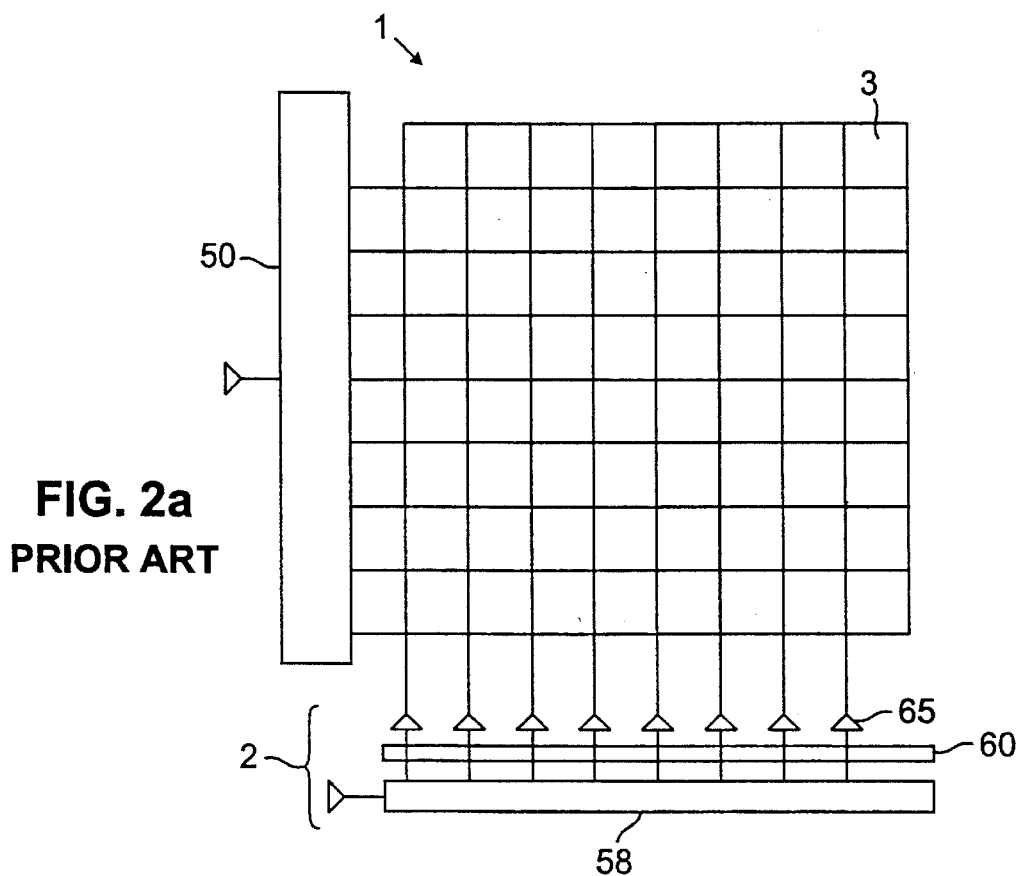
FIG. 2a is a prior art method for controlling the display of FIG. 1.
Figure 2B:
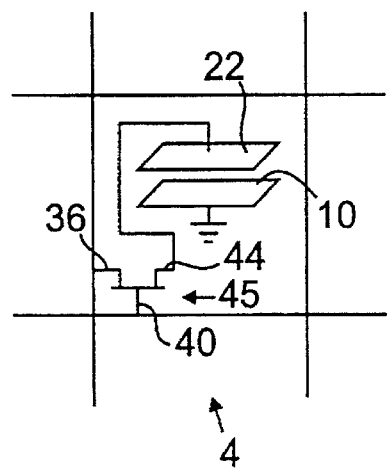
FIG. 2b shows a simplified schematic of conventional modulator drive electronics.
Figure 3:
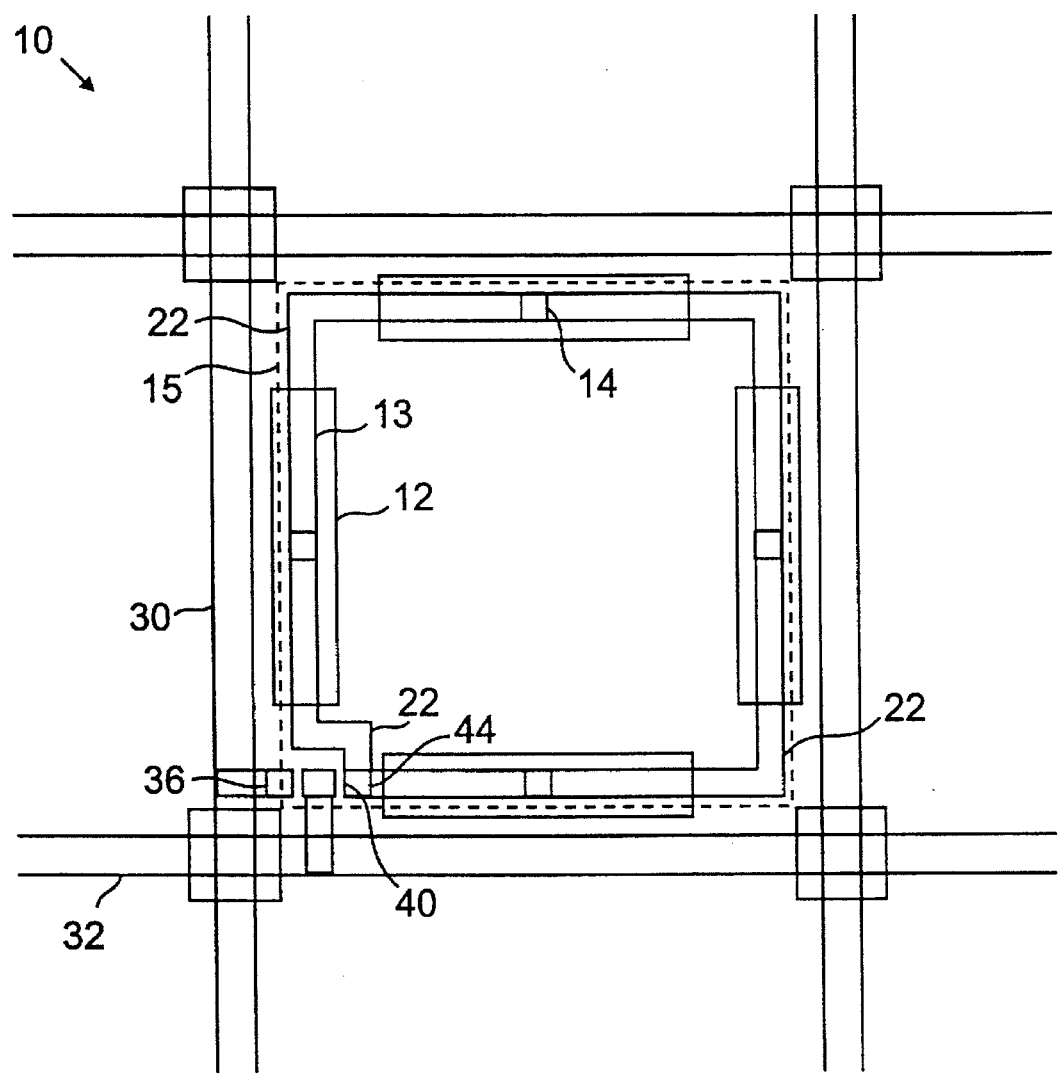
FIG. 3 is an embodiment of drive electronics suitable for controlling the modulators of the present invention.

FIG. 2 shows the display drive electronics 2 used to implement the addressing scheme of Younse. In one embodiment, the display drive electronics 2 may have a line-address format wherein the information to the modulators 3 is updated one line at a time. Exemplary modulator drive electronics 4 are shown in FIGS. 2b and 3. Each modulator 3 has at least one address transistor 45. The address transistor 45 comprises a drain 36, a gate 40 and a source 44. Within one row of pixels, i.e., modulators 3, the gate 40 of an address transistor 45 is connected to the gate 40 of each adjacent address transistor 45 so that all gates 40 within the row are connected together. A gate decoder 50 drives each row of pixels. Within one column of pixels, each transistor drain 36 is interconnected and driven by a serial-to-parallel (S/P) converter 60 and by a drain driver amplifier 65.

Referring to FIGS. 2a, 2b and 3, data, corresponding to an image, is fed continuously into CCD shift registers 58. Once data has been loaded into the CCD shift registers, it is parallel-shifted to the drain drive amplifiers 65. After the data has been shifted, the gate decoder 50 activates one row of address transistors by sending a signal along gate line 32 which biases the gate 40 of each address transistor 45 in the row. The address transistor 45 can then deliver the data signal from the data line 30 onto the modulator address electrode 22. This address sequence is repeated one line at a time. In this manner, data representative of an image is transferred to each modulator 3.

Implementation of the display drive electronics 2 and the modulator drive electronics 4 is well known to those skilled in the art. The exemplary embodiments of the drive electronics 2, 4 that are shown in FIGS. 2 and 3 are not intended to be limiting. Any suitable arrangement of drive electronics 2, 4 that will occur to those skilled in the art may be used in conjunction with the micromechanical modulator 3 described herein to form a display 1.

As will be discussed below in detail, the modulator 3 comprises a substrate or plateau layer and a membrane made of at least one layer, spaced from the plateau to form an air gap. The modulator further comprises two electrodes, one of which is the modulator address electrode 22. An electrostatic force is generated, or not, as a function of the data signal delivered to the address electrode 22. If an electrostatic force is generated, the membrane moves relative to the substrate or plateau. The refractive indices of the membrane and substrate/plateau are chosen so that the change in position of the membrane results in a change in the reflectivity of the modulator 3. The varying reflectivity of each modulator 3 forming the display 1 is thus controlled by the data signal stored on the address electrode 22. Variation in pixel brightness throughout the display 1, corresponding to the status of each modulator at a given time, i.e., substantially reflecting or absorbing light, generates an image.

The structure, fabrication and operation of the micromechanical modulators 3 are fully described in Ser. No. 187, 676, the specification of which is herein incorporated by reference in its entirety.

As described in U.S. Pat. No. 5,500,761, the micromechanical modulators utilize an optical interference effect to modulate an optical signal. The varying reflectivity of the modulator is primarily a function of the air gap 20 and the relationship of the refractive index of the optical membrane 15 and the refractive index of the layer, typically the substrate 10, which collectively define the air gap 20. When the refractive index of the optical membrane 15 is about equal to the square root of the refractive index of the substrate, an anti-reflection condition can be created. For an optical membrane 15 having a layer or layers $\lambda/4$ in thickness, as measured within the membrane, and an air gap 20 of $m\lambda/4$, as measured within the ambient medium, the membrane 15 and air gap 20 function as a high reflection mirror where m is an odd integer and as an anti-reflection coating where m is 0 or an even integer. $\lambda$ refers to the wavelength of the light incident upon the optical membrane 15. Thus, as the optical membrane 15 moves one-quarter of a wavelength of the incident light, a minimum or maximum reflectivity state will be encountered, depending upon the size of the air gap when the membrane is in the unbiased position. The ambient medium for the modulators can be, without limitation, air, partial vacuum, or a nitrogen or argon atmosphere.

Figure 4:
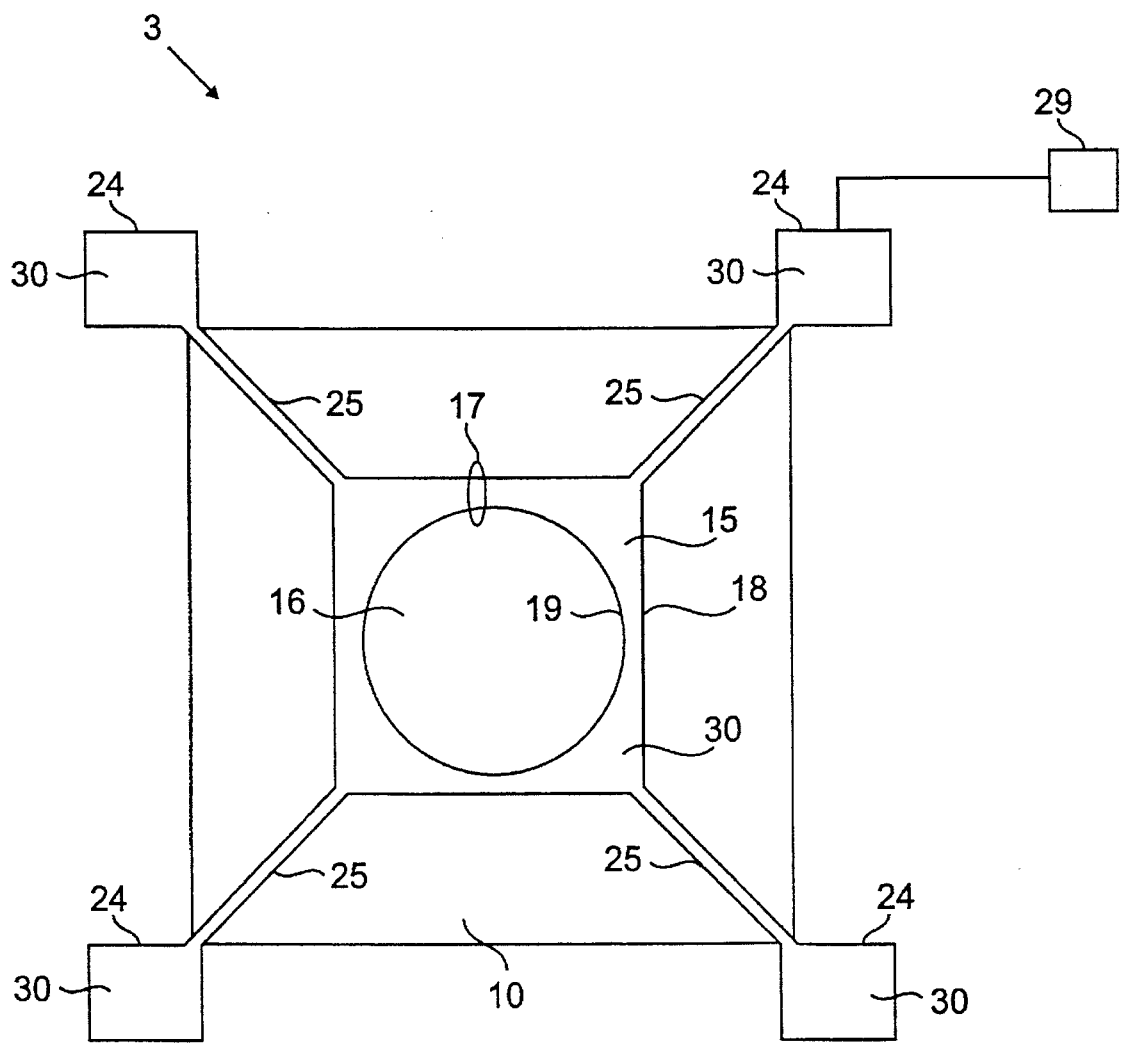
FIG. 4 is an embodiment of a micromechanical modulator.

While a plurality of micromechanical modulators 3, as described in U.S. Pat. No. 5,500,761, may be used to form a direct-view display 1, they are preferably modified as described herein. FIG. 4 shows the structure of an embodiment of the micromechanical modulator 3 as taught in U.S. Pat. No. 5,500,761. An optical membrane 15 is supported at each corner by a support arm 25. The positioning of the support arms dictates how closely adjacent modulators 3 may be placed to one another in forming the display 1. It should be appreciated that this support arm arrangement results in a low filling factor for the display.

FIGS. 5a–5c, 6a–6c and 7a–7c show several embodiments of a modification of the micromechanical modulator 3 of U.S. Pat. No. 5,500,761, wherein the supports for the optical membrane 15 are located more directly beneath the optical membrane. Since these supports do not protrude substantially beyond the edges of the optical membrane 15, modulators 3 having such a structure can be packed more closely than those having the structure shown in FIG. 4. Forming a display 1 using any of the exemplary embodiments of the modulators 3 as shown in FIGS. 5–7 increases the filling factor, hence the resolution, of the display.

Figure 5A:
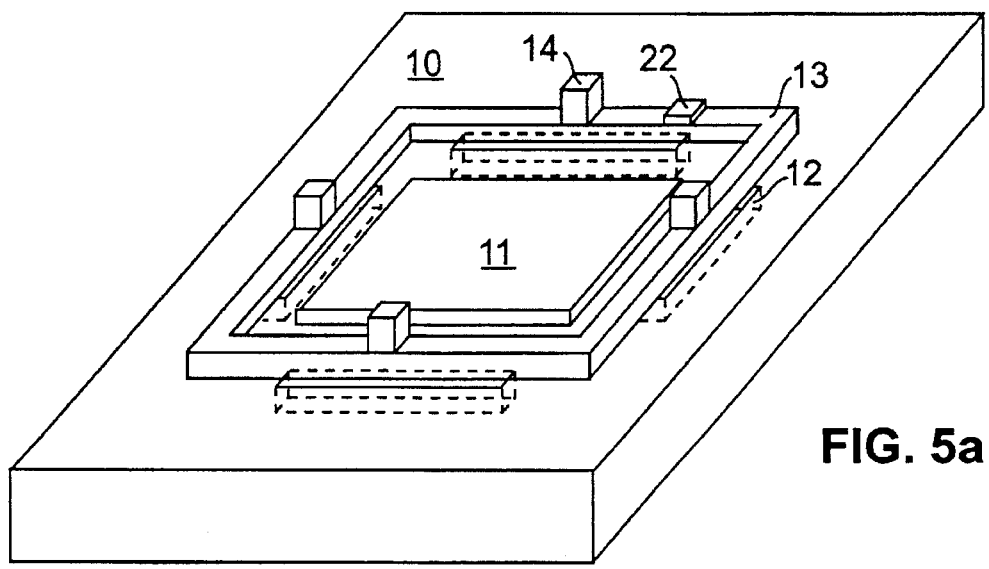
FIGS. 5a–5c show several views of a first preferred embodiment of a micromechanical modulator.
Figure 5B:
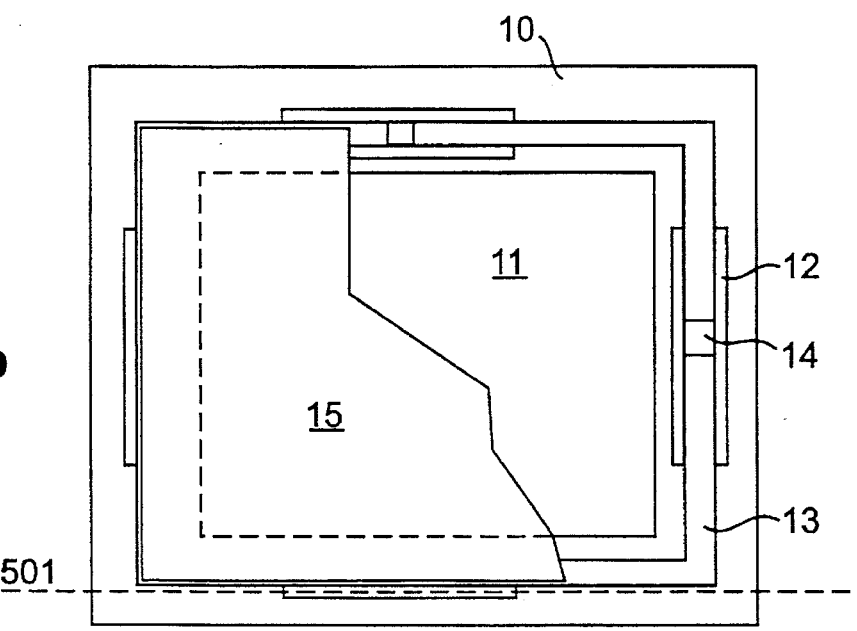
Figure 5C:
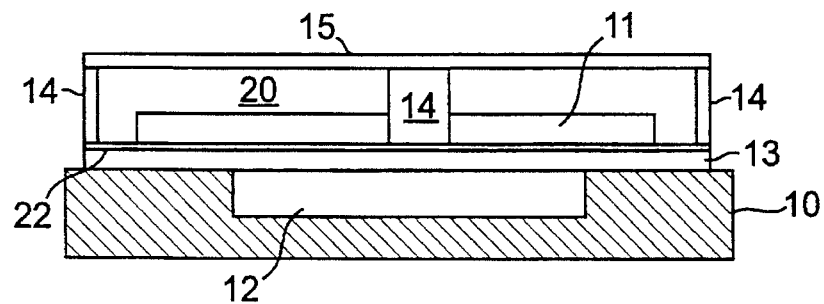

FIGS. 5a–5c show a first preferred embodiment of a micromechanical modulator 3 suitable for forming the display 1 of the present invention. The modulator 3 is shown in perspective in FIG. 5a and in a plan view in FIG. 5b. FIG. 5c is a cross section through the line AA in FIG. 5b. The optical membrane 15 is not shown in FIG. 5a, and shown cutaway in FIG. 5b to better illustrate the features of the modulator 3.

Referring to FIGS. 5a–5c, the modulator comprises an optical membrane 15 which is supported by pedestals 14 which rest on pedestal supports 13. A modulator address electrode 22 is located on top of the pedestal supports 13. Trenches 12 are located in the substrate 10 underneath the pedestal supports 13. A plateau 11 is located within the region defined by the pedestal supports 13. The pedestals 14 support the optical membrane 15 above the plateau 11 so that an air gap 20 is formed between the optical membrane and the plateau. The air gap 20 should be at least one-quarter of the median wavelength of the light signal being modulated. As described in detail in U.S. Pat. No. 5,500,761, the optical membrane 15 for this and all other embodiments of a modulator 3 suitable for use in the present invention can be comprised of one or two layers. In a two layer membrane, the additional layer functions as a strained layer for producing tension in the optical membrane 15. A second electrode (not shown in the Figures) should be located in the trench 12 if the substrate is not suitably conductive. Typically, the substrate 10 or the second electrode of each of the modulators comprising the display will be maintained at ground potential.

When a voltage difference exists between the modulator address electrode 22 and the substrate 10, an electrostatic force will be generated which causes the portion of the pedestal support 13 located over the trenches 12 to move into the trench. Since the optical membrane 15 is supported by pedestals 14 which rest on the pedestal supports 13, the optical membrane will move from its unbiased state toward the plateau 11 in response to the pedestal support's movement. As discussed above, the refractive indices of the optical membrane 15 and the plateau 11 are chosen so that the change in the position of the optical membrane results in a change in the reflectivity of the modulator 3.

The modulator 3 shown in FIGS. 5a–5c may be formed as follows. A film of poly-silicon is first deposited on a standard p-doped silicon substrate, which may be in the form of a wafer. After deposition, the film is patterned, using standard photolithographic methods, into the plateau 11 for each display pixel. The film is deposited to a thickness equal to the sum of the height of pedestal 14, the thickness of pedestal support 13, and the thickness of the modulator address electrode 22, minus at least one-quarter of the median wavelength of the light signal being modulated. Assuming a median wavelength of about 540 nanometers (nm), at least 135 nm should be subtracted from the aforementioned sum. This will place the top of the plateau 11 at least 135 nm below the top of the pedestals 14. This arrangement will provide at least a one-quarter-wavelength air gap 20 between the unbiased optical membrane 15 and the plateau 11.

Alternately, the plateau 11 could be formed by appropriately masking the substrate 10 and then etching. Since electronics will be formed in the substrate, and forming electronics in etched silicon often results in defects, this method is not preferred. A third method for forming the plateau 11 comprises depositing silicon nitride on the substrate 10 and patterning the silicon nitride so that it covers the substrate at the locations where plateaus are desired. The substrate is then placed in an oxidation furnace, and conditions are controlled so that oxygen penetrates the silicon substrate, forming silicon dioxide, to a depth equal to the desired height of the plateau 11. The region underneath the silicon nitride will not be oxidized. Silicon dioxide and silicon nitride are removed, leaving plateaus at the desired location.

Next, an array of n-channel MOSFETs, one for each pixel of the display, is formed using standard IC fabrication. Trenches 12 are etched into the substrate to a depth approximately equal to the air gap 20 using appropriate etching methods, including, without limitation, reactive ion etching (RIE), ion milling, or wet chemical etching. These trenches are then filled with an appropriate sacrificial material, such as spin on glass (SOG), BPTEOS, high etch rate silicon nitride, aluminum, or copper. A film of mechanical material is then deposited on the surface over the trenches 12 and patterned into a ridge around each plateau 11. This ridge will form the pedestal support 13. The mechanical film can consist of any appropriate material, such as poly-silicon, silicon nitride, polyimide or composites thereof.

Next, an electrically conductive material is deposited on the ridge and patterned to form the modulator address electrode 22. The conductive material can be doped polysilicon, or evaporated metals such as gold, or aluminum. Preferably, the modulator address electrode 22 should be formed from material, such as doped polysilicon, that can be anti-reflection coated. A second sacrificial layer of the same type as used to fill the trenches 12 is deposited over the wafer. This layer should be deposited to the desired thickness of the air gap 20. Holes are then formed in the second layer using an appropriate etching method, such as those previously discussed. These holes are then filled to the same height as that of the second layer with structural material, such as polysilicon, polyimide, silicon nitride or composites thereof. The structural material is then patterned into pedestals 14.

Next, a film of structural material, such as polysilicon, nitride, or polyimide is deposited and patterned into the optical membrane 15. Finally, a suitable etch is used to remove all sacrificial material resulting in a suspended optical membrane 15 with integral pedestals, as shown in FIG. 5a.

Figure 6A:
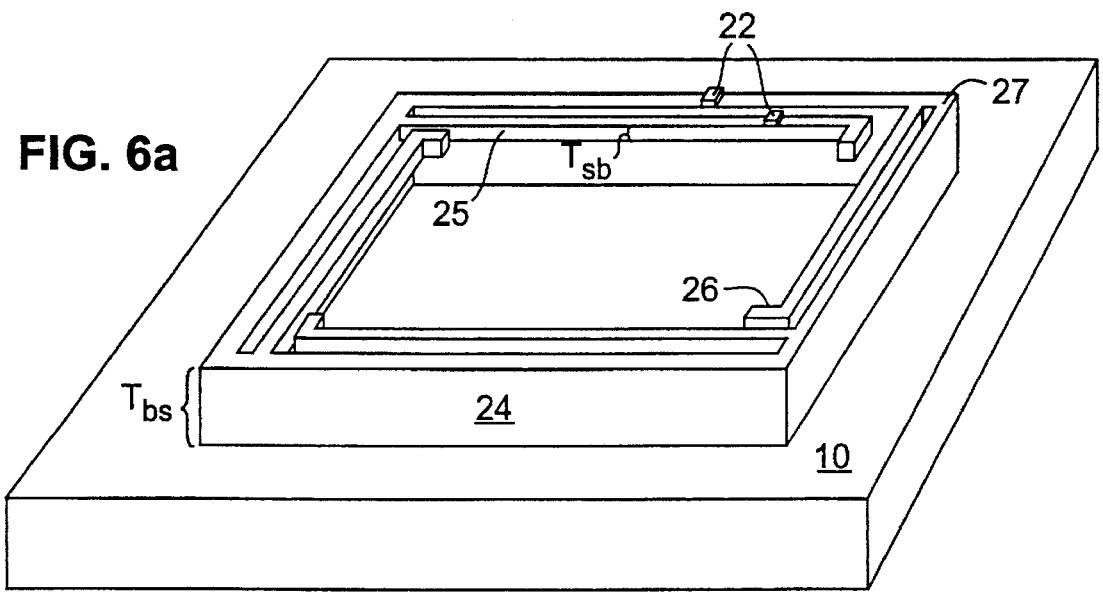
FIGS. 6a–6c show several views of a second preferred embodiment of a micromechanical modulator.
Figure 6B:
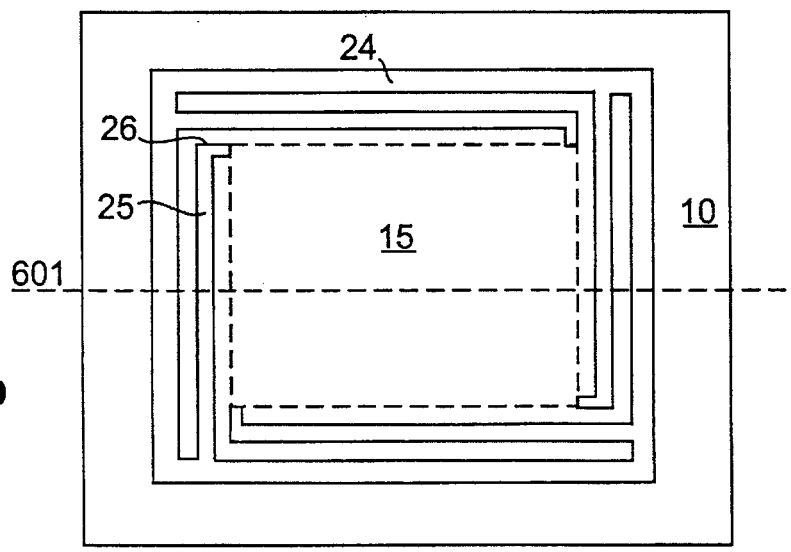
Figure 6C:
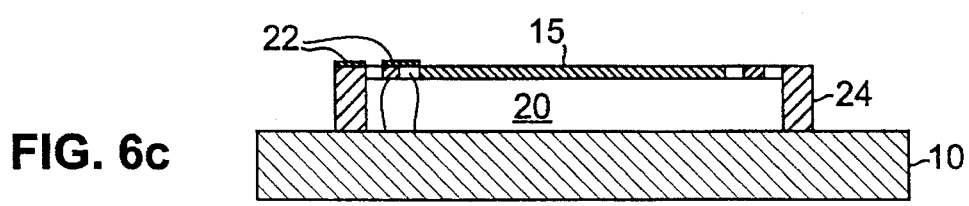

A second preferred embodiment of a modulator 3 is shown in FIGS. 6a–6c. FIG. 6c is a cross section through line 601 in FIG. 6b. The optical membrane 15 is not shown in FIG. 6a and shown in phantom in FIG. 6b to better illustrate the support beam arrangement.

As shown in FIGS. 6a–6c, four support beams 25 protrude from a beam support 24. A membrane support 26 is located at the terminus of each support beam 25. An optical membrane 15 is supported by the membrane supports 26.

The beam support 24 rests on top of a substrate 10. The beam support 24 is thicker than the support beams 25; that is, $T_{bs} > T_{sb}$. Since the support beams 25 protrude from the beam support 24 near the beam support's upper surface 27, an air gap 20 is defined between the optical membrane 15 and the substrate 10. A modulator address electrode 22 is located on the upper surface 27 of the beam support 24 and on the upper surfaces 28 and 29 of the support beams 25 and the membrane supports 26, respectively. The modulator address electrode 22 must be in electrical contact with modulator drive electronics 4 so that a data signal can be delivered to the modulator address electrode. As described for the previous embodiment, the drive electronics may be fabricated in the substrate contiguous to each modulator 3. The substrate should be appropriately doped so that it is conductive, or an electrode should be deposited on the substrate underneath the support beams 25. Additionally, an electrode can optionally be deposited at the perimeter of the optical membrane 15.

Under the action of bias, which is provided by a data signal, an electrostatic force is generated which causes the support beams 25 to bend toward the substrate. The deflection in the support beams 25 is greatest near the membrane support 26. The optical membrane 15 will be drawn towards the substrate 10 in conjunction with the deflection of the support beams 25. As previously noted and described in detail in our copending application Ser. No. 08/187,676, the change in position of the optical membrane 15 will result in a change of the reflectivity of the modulator 3.

Figure 7A:
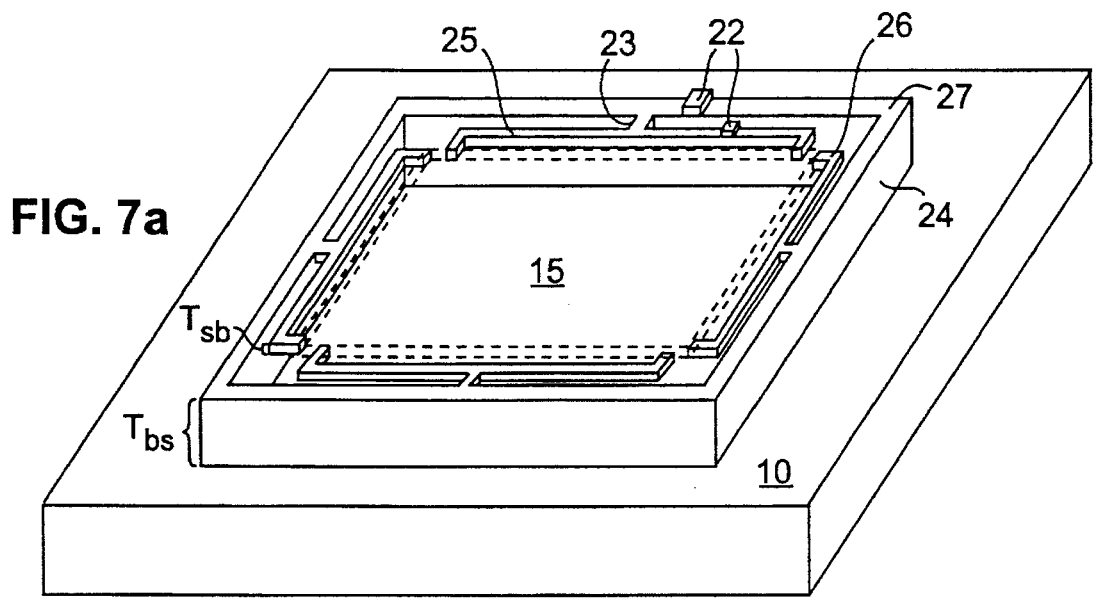
FIGS. 7a–7c show several views of a third preferred embodiment of a micromechanical modulator.
Figure 7B:
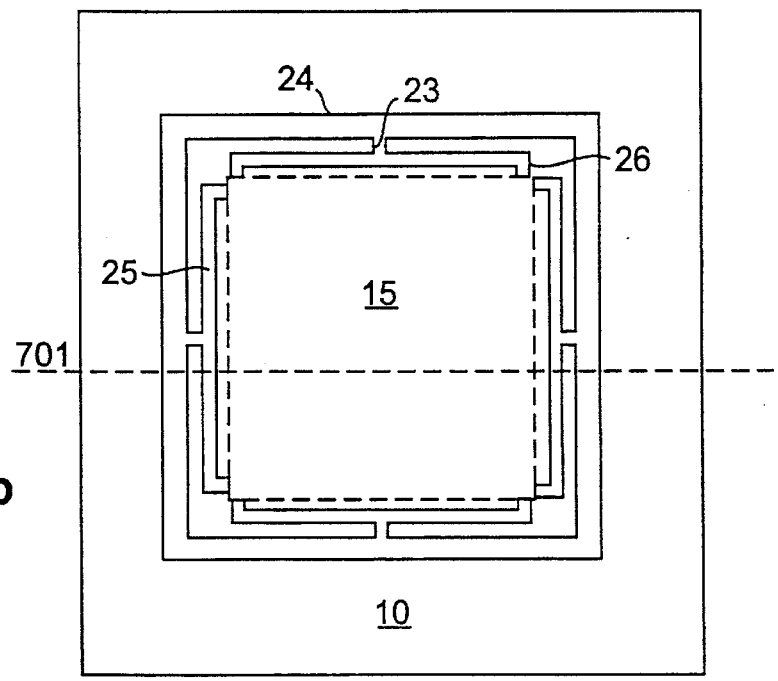
Figure 7C:
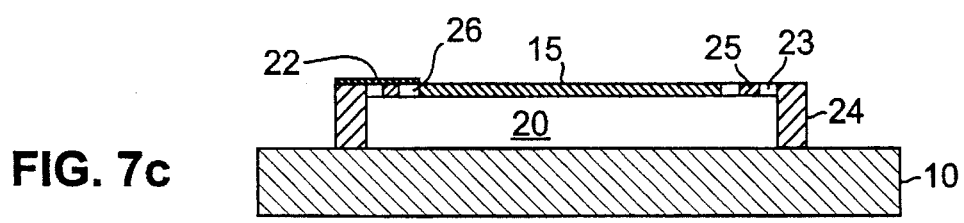

A third preferred embodiment of a modulator 3 useful in conjunction with the present invention is illustrated in FIGS. 7a–7c. FIG. 7c is a cross section through line 701 in FIG. 7b. Again, the optical membrane 15 is shown in phantom in FIGS. 7a and 7b to better illustrate the support beam arrangement.

In a manner similar to the second preferred embodiment, four support beams 25 protrude from a beam support 24. A bridging beam 23 connects the support beams 25 to the beam support 24. The bridging beam 23 is located near the center of each side of beam support 24 and near its upper surface 27. Membrane supports 26 are located at each end of each support beam 25. An optical membrane 15 is supported by the membrane supports 26.

The beam support 24 rests on top of a substrate 10. The beam support 24 is thicker than the support beams 25; that is, $T_{bs} > T_{sb}$. Since the support beams 25 are located near the beam support's upper surface 27, an air gap 20 is defined between the optical membrane 15 and the substrate 10. A modulator address electrode 22 is located on the upper surface 27 of the beam support 24 and on the upper surfaces 27 and 28 of the support beams 25 and the membrane supports 26, respectively. The modulator address electrode 22 must be in electrical contact with modulator drive electronics 4 so that a data signal can be delivered to the modulator address electrode. As described for the first preferred embodiment, the drive electronics may be fabricated in the substrate contiguous to each modulator 3. The substrate should be appropriately doped so that it is conductive, or an electrode should be deposited on the substrate underneath the support beams 25 and membrane supports 26.

Under the action of bias, which is provided by a data signal, the support beams 25 bend toward the substrate 10. The deflection in the support beams 25 is greatest near the membrane supports 26, which may contact the substrate. The center of the support beam 25 where the bridging support 23 joins the support beam will remain in a relatively fixed position relative to the substrate. The optical membrane 15 will be drawn towards the substrate 10 in conjunction with the deflection of the support beams 25. As previously noted, the change in position of the optical membrane 15 will result in a change of the reflectivity of the modulator 3.

The exemplary second and third preferred embodiments may be formed using the techniques described in U.S. Pat. No. 5,500,761. Differences in the shape, size and position of the various elements comprising the modulators described herein, as compared to the modulators of U.S. Pat. No. 5,500,761, will require using different masks to pattern such elements. The required modifications will be within the abilities of those skilled in the art.

In a most preferred embodiment of the modulator 3, the optical membrane 15 and the substrate 10 or plateau 11 are spaced so that the air gap 20, in the unbiased state, is one-quarter of a wavelength of the optical signal. Further, under the action of bias, the optical membrane 15 contacts the plateau so that the air gap 20 is zero. In the unbiased state, the optical membrane 15 and air gap 20 function as a high reflectivity mirror. In the biased state, the optical membrane functions as an anti-reflection coating for the plateau 11.

It is recognized that modifications of the present invention will occur to those skilled in the art in view of the present teaching. For example, it is not required that the pedestal support 13 of the first preferred embodiment, and the beam support 24 of the second and third preferred embodiments, be a closed mesa or ridge in the form of a rectangle as shown in the drawings. For example, four individual ridges can be used to form such supports. It should also be appreciated, according to the teachings of U.S. Pat. No. 5,500,761, that the air gap 20 defined by the optical membrane 15 and the substrate 10 or plateau 11 may be greater than one-quarter of a wavelength of the optical signal. These and other modifications are considered to be within the contemplated scope of the present invention.

Micromechanical modulators according to the teachings of U.S. Pat. No. 5,500,761 have been made and tested. A large area modulator having a membrane of 100×100 microns with m=4 (an air gap equal to one wavelength of the incident optical signal) using a 12 volt drive had a rise and fall time for the optical membrane of about 10 microseconds. Smaller devices have been fabricated with rise times of 250 nanoseconds.

Figure 8:
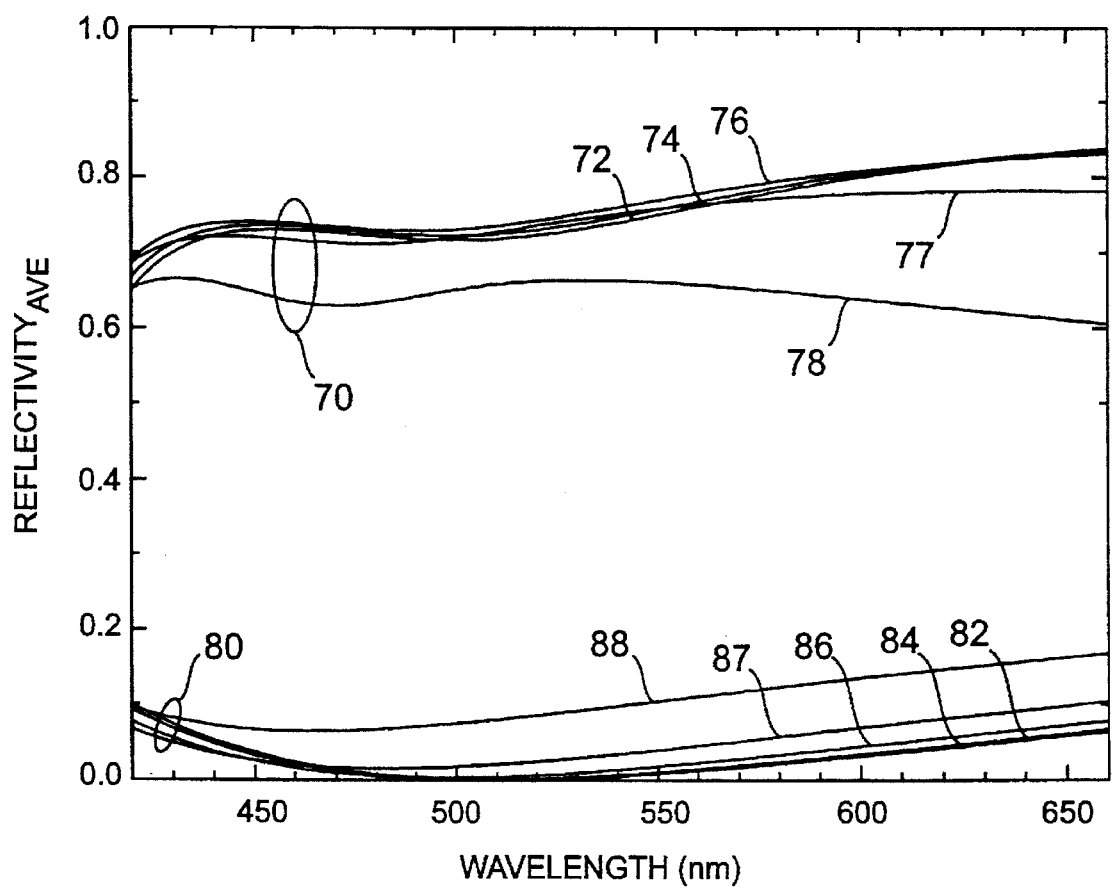
FIG. 8 shows the spectra for a display according to the present invention.

A display according to the present invention has been modeled. The performance of a pixel of the display, i.e., the modulator, is shown in FIG. 8 as a plot of reflectivity of a modulator versus the wavelength of the optical signal at a number of viewing half-angles. The spectra collectively identified by the reference numeral 70 represents the high reflection condition for the modulator. The spectra collectively identified by the reference numeral 80 represents the low reflection condition of the modulator. The viewing half-angles, identified by reference numerals 72–78 at the high reflection condition and numerals 82–88 at the low reflection condition, refer to the position of an observer relative to the normal to the display, i.e., 0°, 15°, 30°, 45° and 60°. Referring to FIG. 8, greater than 7:1 contrast is obtained over the entire visible light spectrum for viewing half-angles as large as 45°. Approximately 70 percent reflectivity is obtained over the entire visible spectrum.

The optical signal is assumed to be unpolarized. If the light was polarized, the spectra would shift somewhat. The modulator modeled in FIG. 8 is assumed to have a two-layer membrane consisting of a nitride layer of 630 angstroms and a polysilicon layer of 300 angstroms. The refractive index of the nitride layer is 2.

The angle of incidence of the optical signal upon the modulators forming the display affects the spectra of the display. For the modulator modeled in FIG. 8, the light source was assumed to be ambient light, so that the viewing half-angles represent the angle of incidence of the optical signal upon the modulator. The air gap 20 should be adjusted where the angle of incidence is other than normal to the display, i.e., 0°. For an angle of incidence $\theta$, the air gap should be m$\lambda$/4/ (cosine $\theta$). Thus, in the design of a display according to the invention, where ambient light is used as the light source, it is preferable to design the air gap based on an angle $\theta$ between about 0° and 45°. For the modulator modeled in FIG. 8, the air gap was based on an angle $\theta$ of 30°, though no particular angle is presently preferred. Thus, the modulator modeled in FIG. 8 has an unbiased air gap equal to 1×($\lambda$/4) / (cosine 30°). In the low reflection condition, the air gap is 0.

Further, since the refractive index of silicon varies as a function of the incident optical signal, an average value for the refractive index should be selected for the substrate 10, assuming it is silicon.

What is claimed:

1. A direct-view display comprising:
a plurality of micromechanical modulators which have a variable and controllable reflectivity to an incident optical signal wherein the micromechanical modulators are organized in an array characterized by rows and columns, each micromechanical modulator comprising:
a substrate having a refractive index; and
an optically transparent membrane in spaced and superposed relation to the substrate defining a gap therebetween, the membrane comprising at least a first layer of material, the first layer having a refractive index which is approximately equal to the square root of the refractive index of the substrate, wherein, the membrane is movable between a first position and a second position in response to a data signal, changing the gap resulting in a change in modulator reflectivity;
drive electronics for individually controlling the reflectivity of each of the micromechanical by selective application of the data signal; and
a light source for generating the optical signal.

2. The direct-view display of claim 1 wherein the substrate is p-doped silicon.

3. The direct-view display of claim 1 wherein the optical membrane is selected from the group consisting of polysilicon, silicon nitride and polyimide.

4. The direct-view display of claim 1 further comprising a flexible support that spaces the membrane from the substrate, wherein the flexible support is located substantially beneath the membrane from the perspective of the substrate.

5. The direct-view display of claim 4 wherein the flexible support comprises a plurality of pedestals positioned over a plurality of trenches.

6. The direct-view display of claim 1 wherein the flexible support comprises a plurality of flexible beams fixed to a support.

7. The direct-view display of claim 1 wherein the gap is an integer multiple of one-quarter of a wavelength of the optical signal when the membrane is in the first position.

8. The direct-view display of claim 1 wherein each modulator further comprises an address electrode for receiving the data signal from the drive electronics.

9. The direct-view display of claim 8 wherein the drive electronics comprise:

an address transistor, one for each modulator of the display, which is in electrical contact with the address electrode of the modulator, the address transistor having a gate and a drain, wherein the gate is electrically connected to a gate line, each row of modulators in the array having its own gate line, and the drain is electrically connected to a data line, each column of modulators in the array having its own data line;

a gate decoder which is in electrical contact with each address transistor in a row of modulators through the gate line;

shift registers for receiving the data signal, which shift registers are in electrical contact with a serial-to-parallel converter to parallel shift the data signal received by the shift registers; and a driver amplifier electrically connected to the data line, each data line having its own driver amplifier, which receive the parallel shifted data signal, wherein once a data signal has been received by the shift registers and parallel shifted, the gate decoder activates one row of address transistors by sending a signal along the gate line that is electrically connected to the one row, biasing the gate of each address transistor in the one row, which allows the data signal from the data line to be delivered to the address electrode of the modulator which is located at that particular row and column address.

* * * * *